US007464860B2

(12) United States Patent
Militello et al.

(10) Patent No.: US 7,464,860 B2
(45) Date of Patent: Dec. 16, 2008

(54) CONDUCTING ASSISTED SELF-SERVICE TRANSACTIONS IN A BANKING FACILITY THROUGH A DATABASE SCHEMA

(75) Inventors: Joseph Militello, Dayton, OH (US); Mario Perottino, Springboro, OH (US); Gerard Savage, Fife (GB); Norman Taylor, Dundee (GB)

(73) Assignee: NCR Corporation, Dayton, OH (US)

(*) Notice: Subject to any disclaimer, the term of this patent is extended or adjusted under 35 U.S.C. 154(b) by 206 days.

(21) Appl. No.: 11/316,037

(22) Filed: Dec. 22, 2005

(65) Prior Publication Data

US 2007/0145114 A1 Jun. 28, 2007

(51) Int. Cl.
*G07F 19/00* (2006.01)
*G06K 5/00* (2006.01)
*G06K 15/00* (2006.01)

(52) U.S. Cl. ........................ 235/379; 235/382; 235/383

(58) Field of Classification Search ......... 235/379–383, 235/492; 705/16–18, 35, 39, 41, 43
See application file for complete search history.

(56) References Cited

U.S. PATENT DOCUMENTS 3,876,864 A 4/1975 Clark et al.
5,563,393 A * 10/1996 Coutts ........................ 235/379
5,752,582 A * 5/1998 Hayward ..................... 186/61
6,003,019 A 12/1999 Eaton et al.
6,012,050 A 1/2000 Eaton et al.
6,013,107 A 1/2000 Blackshear et al.
6,305,603 B1 * 10/2001 Grunbok et al. ............. 235/379
6,530,520 B1 * 3/2003 Snyder et al. ............... 235/383
6,588,549 B2 * 7/2003 Wike et al. ..................... 186/61
6,702,181 B2 * 3/2004 Ramachandran ............ 235/380
6,793,134 B2 * 9/2004 Clark ......................... 235/379
7,040,533 B1 5/2006 Ramachandran
2002/0138432 A1 * 9/2002 Makino et al. ................ 705/43

* cited by examiner

*Primary Examiner*—Le Thien Minh
*Assistant Examiner*—April A Taylor
(74) *Attorney, Agent, or Firm*—John D. Cowart; Priest & Goldstein PLLC

(57) ABSTRACT

A system for use in assisting a self-service transaction at a service facility includes one or more self-service terminals, each configured to gather transaction information associated with a customer who is engaged in a business transaction with the service facility through the self-service terminal. A data-management system is configured to store the transaction information gathered from each customer according to a database schema created for the service facility. The system also includes a teller terminal configured to receive at least some of the transaction information from the database system and display it for viewing by a human representative of the service facility while the customer is still engaged in the business transaction.

27 Claims, 7 Drawing Sheets

CONDUCTING ASSISTED SELF-SERVICE TRANSACTIONS IN A BANKING FACILITY THROUGH A DATABASE SCHEMA

BACKGROUND

Assisted self-service is becoming increasingly common in many types of consumer transactions, most notably in areas such as retail-store check-out, airport check-in, and fast-food purchasing. These transactions are "self service" in nature in that the consumer is enabled by the underlying self-service technology to perform a transaction with little, if any, assistance from a human representative of the service provider. These transactions are "assisted" in nature in that a human representative of the service provider typically monitors the self-service transaction from a nearby vantage point and is available to help the consumer complete the transaction if need be.

For years the banking industry has been a leader in self-service through the automated teller machine, or ATM. Despite the ubiquity and general familiarity of the ATM throughout much of the world, however, the demand for human involvement in consumer transactions in the banking industry remains high. This is true for at least two reasons: (1) Many banking transactions do not lend themselves to completion on a fully automated self-service machine; and (2) many banking customers simply are not comfortable conducting transactions through an ATM, particularly those who have made a journey to a branch banking facility. The result is that the banking customers continue to rely heavily on direct interaction with the human representatives (the "branch tellers") of the banking institutions, even for transactions that could be conducted without such interaction.

Very recently, banking institutions have begun to explore the possibilities for conducting assisted self-service in their physical branches. Under this model, consumers are able to conduct transactions, at least in part, on a self-service terminal, with assistance from a branch teller if needed. To date, however, attempts at assisted self-service in the banking industry have been rudimentary at best, and the financial institutions are finding it very difficult to conduct these transactions efficiently and effectively in the real-world environment, particularly since the technology platforms on which banking transactions occur are often highly fragmented—constructed from components that come from multiple vendors or that represent multiple generations of a vendor's technology.

SUMMARY

Described below is a system for use in assisting a self-service transaction at a service facility. The system includes one or more self-service terminals, each configured to gather transaction information associated with a customer who is engaged in a business transaction with the service facility through the self-service terminal. The system also includes a data-management system configured to store the transaction information gathered from each customer according to a database schema created for the service facility, as well as a teller terminal configured to receive at least some of the transaction information from the database system and display it for viewing by a human representative of the service facility while the customer is still engaged in the business transaction.

The transaction information retrieved by the teller terminal often includes information indicating that the customer needs assistance from the human representative of the service facility at the self-service terminal. The transaction information retrieved by the teller terminal also often includes information indicating that the self-service terminal is in need of service.

In some systems, the data-management system includes a relational database that includes one or more relational tables. In others, the data-management system includes a file-management system that manages one or more files of data, such as one or more XML-based files.

In some systems, the data-management system is configured to store information identifying each of the self-service terminals to be monitored by the teller terminal and to store information indicating an operational status of each of the self-service terminals. The data-management system is also often configured to store information indicating one or more components that comprise one or more of the self-service terminals and to store information indicating an operational status of each of the components.

In many of these systems, the data-management system is configured to store information identifying a customer session for each customer who is engaged in a business transaction through one of the self-service terminals. In these systems, the data-management system is often configured to store information identifying the customer associated with each customer session and a type of transaction in which the customer is engaged during the customer session. The data-management system is also often configured to store information associated with more than one transaction in which the customer is engaged during the customer session, as well as information identifying one or more customer accounts affected by one or more of the transactions in which the customer is engaged.

Other features and advantages will become apparent from the description and claims that follow.

DETAILED DESCRIPTION

Figure 1:
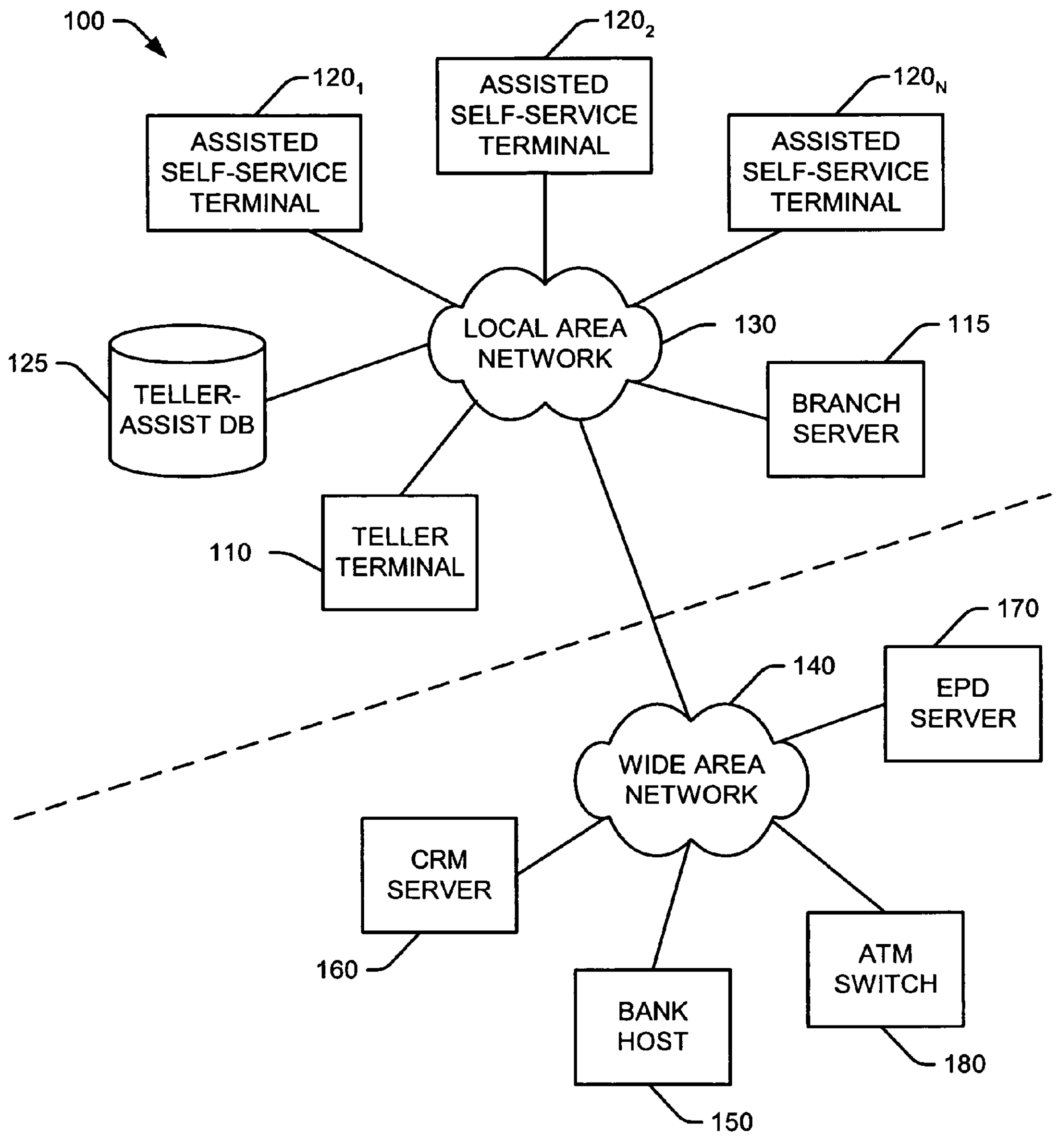
FIG. 1 shows a banking facility that supports assisted self-service transactions.

FIG. 1 shows an example of the infrastructure 100 of a banking facility ("branch") for a banking institution that supports assisted self-service transactions for its customers. The infrastructure includes at least one teller terminal 110 (and often more) that interacts with multiple assisted self-service terminals 120$_{1 \ldots N}$. The assisted self-service terminals 120$_{1 \ldots N}$ are used by bank customers to engage in banking transactions that either cannot be completed on traditional ATMs or for which the customers are uncomfortable using an ATM. The teller terminal 110 is used by a human representative ("teller") of the banking institution to monitor and, when needed, to assist customers engaged in transactions at the assisted self-service terminals 120$_{1 \ldots N}$. In many cases, the teller terminal 110 is also used to complete or fulfill the customer's transactions.

The teller terminal 110 and assisted self-service terminals $\mathbf{120}_{1 \ldots N}$ each connect to a local area network ("branch LAN") 130 that resides in the banking facility. The LAN 130 in turn connects to a wide area network ("WAN") 140 that links the banking facility to banking services located outside the banking facility. For many banking institutions, the WAN 140 is a computer network that connects at least some portion, if not all, of the institution's branch locations to a central repository of information and banking services. This repository typically resides on one or more bank host servers 150, which are computer systems located across the institution's network. The WAN 140 also often connects the banking facility to services such as a customer-relationship management ("CRM") server 160, which stores information about customers of the banking institution and supports applications that allow the banking facility to access this customer information and use it to improve and expand the business relationship that the bank has with these customers. The WAN 140 also often connects the banking facility to an electronic-payment-and-deposit ("EPD") processing server 170, which facilitates the electronic execution of payment and deposit transactions involving written financial instruments, such as checks, using image capture and other electronic techniques to substitute for the physical processing of the instrument. The WAN 140 also typically connects the banking facility and its self-service terminals to an ATM switch 180, which in turns connects to the worldwide ATM network that allows customers to perform self-service financial transactions at ATMs all over the world. Bank host servers, CRM servers, EPD processing servers, and ATM switches and networks are all well understood in the banking industry and are not described in any more detail here.

Within the banking facility, the LAN 130 also connects the teller terminal 110 and assisted self-service terminals $\mathbf{120}_{1 \ldots N}$ to the bank's branch server 115, a computer system that stores an array of information and provides applications that support the banking transactions that take place in the banking facility. Branch servers like this one are well understood in the banking industry and are not described in any more detail here.

The LAN 130 also connects the teller terminal 110 and the assisted self-service terminals $\mathbf{120}_{1 \ldots N}$ to a teller-assist database (DB) system 125. The teller-assist DB system 125 provides a database schema to serve as a communication mechanism and repository of information for transactions occurring between the teller terminal 110 and the assisted self-service terminals $\mathbf{120}_{1 \ldots N}$. The teller-assist DB system 125 eliminates the need to support many and varying complex messaging interfaces that would otherwise be required in the typical banking facility to support communication between the teller terminal 110 and the assisted self-service terminals $\mathbf{120}_{1 \ldots N}$. In particular, the teller-assist DB system 125 allows, among other things: (1) The teller and assisted self-service terminals to share critical information, such as consumer, account and transaction information, that is obtained through the banking institution's WAN 140 and the existing ATM switch infrastructure; (2) the teller terminal to manage the assisted self-service terminals; and (3) the assisted self-service terminals to report to the teller terminal all consumer and transaction information gathered while executing transactions. The teller-assist DB system 125 and its structure and function are described in more detail below.

Figure 2:
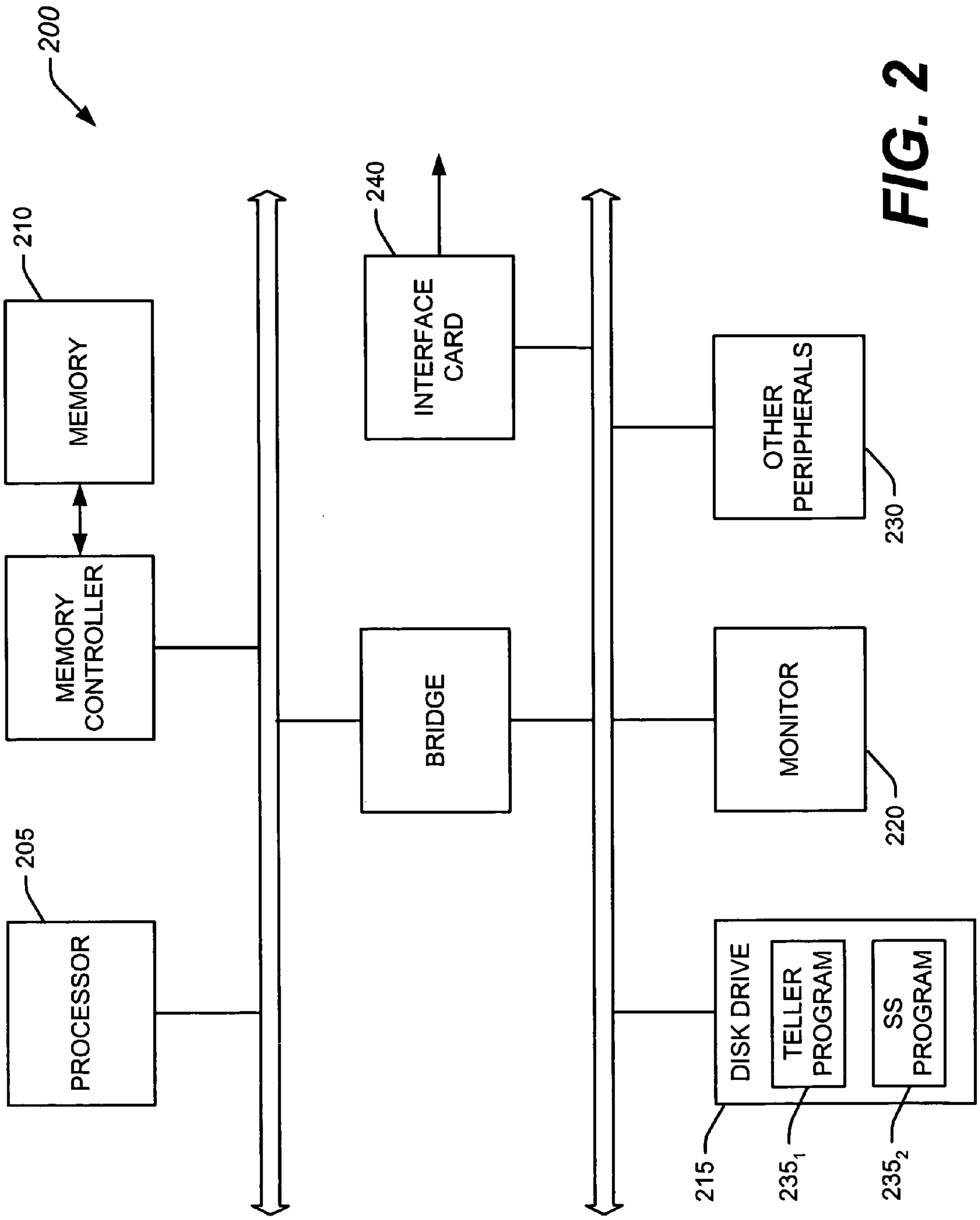
FIG. 2 is a diagram showing a computer system suitable for use in implementing a teller terminal and an assisted self-service terminal in a banking facility.

FIG. 2 shows the typical structure of both the teller terminal 110 and each assisted self-service terminal $\mathbf{120}_{1 \ldots N}$ of FIG. 1. Each terminal is typically implemented as a computer system 200 having some or all of the following components: one or more processors 205, one or more temporary data-storage components 210 (e.g., volatile and nonvolatile memory modules), one or more persistent data-storage components 215 (e.g., optical and magnetic storage devices, such as hard and floppy disk drives, CD-ROM drives, and magnetic tape drives), an input/output device such as a touch-screen or traditional display monitor 220, and one or more peripheral devices 230. For each assisted self-service terminal, the other peripheral devices 230 include any of a wide variety of electronic modules commonly found in banking self-service terminals, including, for example, a card reader, an EPP pin pad, a cash dispenser, a cash acceptor, a coin dispenser, a coin acceptor, a check acceptor, and a receipt printer. For the teller terminal, the other peripheral devices 230 typically include items such as a keyboard, a printer, a check acceptor, a cash dispenser, and a cash acceptor. The computer system 200 that implements each terminal also includes a network interface card 240 that allows the terminal to connect to the LAN in the banking facility.

Each terminal also includes executable program code, in the form of one or more executable program modules, that is usually stored in one of the persistent storage media 215 and then copied into memory 210 at run-time. In the teller terminal, this program code includes a teller program $\mathbf{235}_1$ that controls the operation of the teller terminal. In each assisted self-service terminal, the program code includes a self-service program $\mathbf{235}_2$ that controls the operation of the assisted self-service terminal. The processor 205 in each of the terminals executes the corresponding program $\mathbf{235}_{1\text{-}2}$ by retrieving program instructions from memory in a prescribed order.

Figure 3:
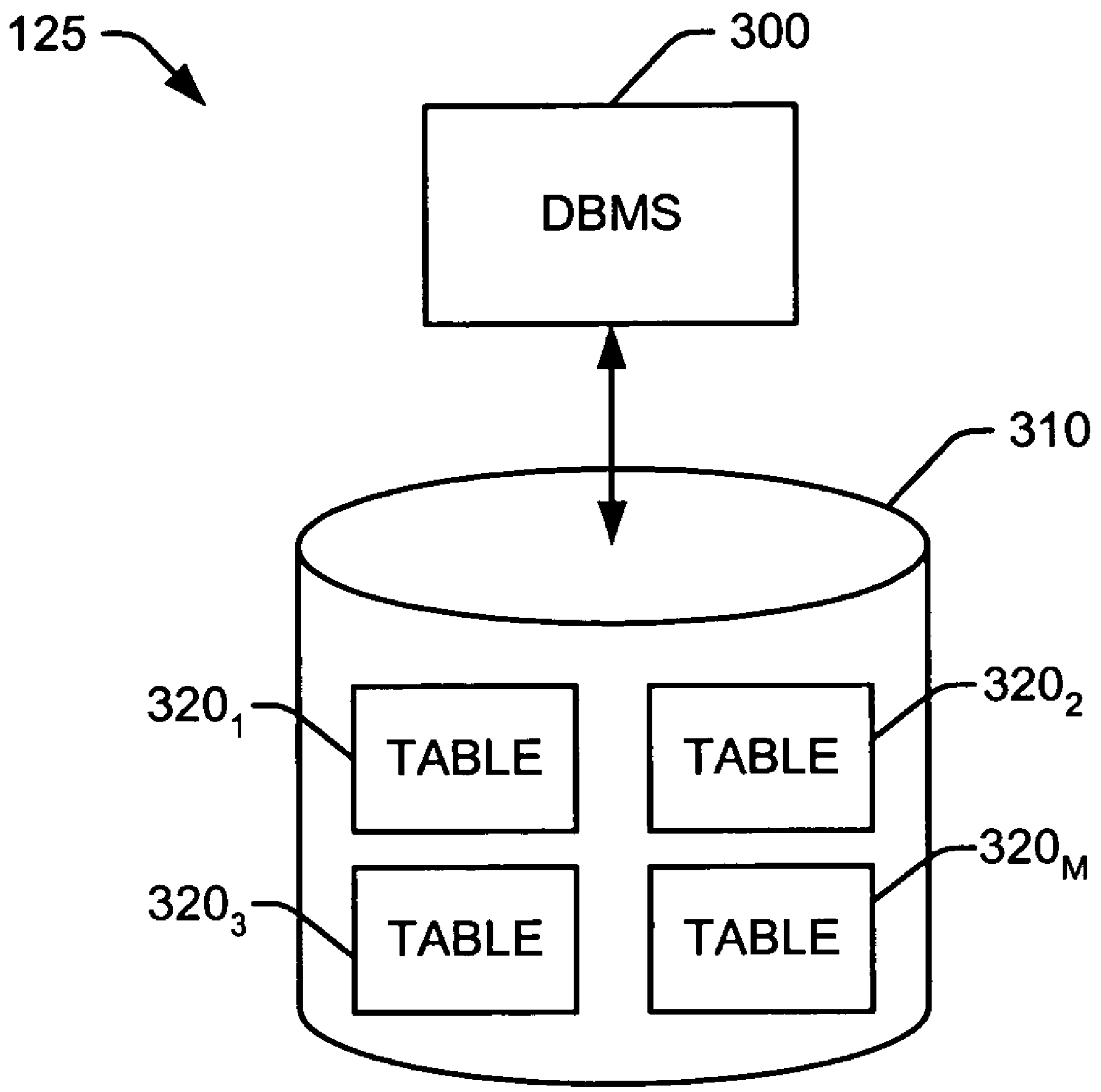
FIG. 3 is a diagram showing the structure of a teller-assist database system.
Figure 4:
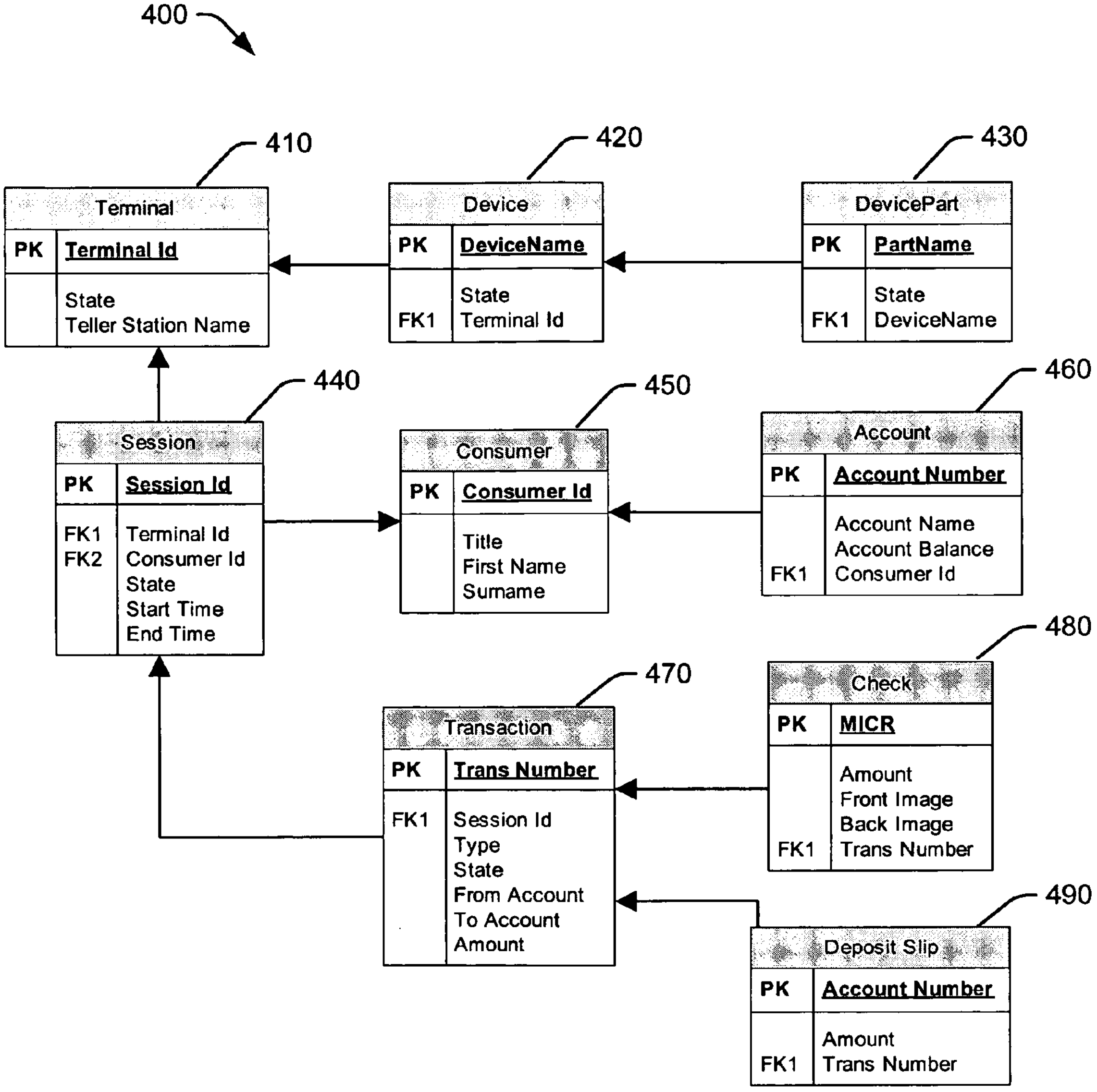
FIG. 4 is a diagram showing a sample database schema for the teller-assist database system of FIG. 3.

FIG. 3 shows one example of a structure for the teller-assist DB system 125 in more detail. The DB system 125 as shown here includes a database-management system ("DBMS") 300 that manages data stored in a data-storage facility 310. The data-storage facility 310 stores data in one or more relational tables $\mathbf{320}_{1 \ldots M}$ that are organized according to some predefined database ("DB") schema 400, an example of which is shown in FIG. 4. A database schema, as that term is used in the art of database engineering, refers to the logical structure, or organization, of a database system. In a relational database system, the DB schema defines the relational tables that exist in the DB system, the data fields that make up each table, and the relationships that exist among the fields and the tables. The DB schema is typically defined in a formal language (known as a data definition language, or DDL) supported by the DB system.

As an alternative to the database structure shown in FIG. 3, the transfer of information between the teller terminal and the assisted self-service terminals often takes place not through relational tables managed by a traditional database-management component, but instead through the exchange of one or more files, typically files that embody the Extensible Markup Language (XML) standard put forth by the World Wide Web Consortium (W3C). Under this arrangement, the XML files would replace the relational tables shown in FIG. 3, and a file-management system would replace the database-management system. The XML files and the information that they store, however, would still be governed by a database schema, like the one described below.

FIG. 4 shows an example DB schema 400 defining the logical structure of the teller-assist DB system. The DB schema 400 defines a variety of relational tables (or XML structures) that allow the teller and assisted self-service terminals to communicate with each other in executing banking transactions. The number and types of tables that exist in any given banking facility will depend upon the characteristics of that facility, including the system configurations of the teller and assisted self-service terminals and the types of assisted self-service transactions that the facility wishes to support.

The DB schema 400 shown here includes several tables, including a "Terminal" table 410 that includes fields to indicate the ID of each assisted self-service terminal ("Terminal ID"), to indicate the operational state of each assisted self-service terminal ("State"), and to indicate the name of the teller terminal associated with each assisted self-service terminal ("Teller Station Name"). Linked to the "Terminal" table 410 are a "Device" table 420 and a "Device Part" table 430. The "Device" table 420 includes a field to indicate the name for each device, or module, associated with an assisted self-service terminal ("Device Name"), as well as fields to indicate the state of each device ("State") and the ID of the assisted self-service terminal to which the device belongs ("Terminal ID"). The "Device Part" table 430 includes a field to indicate the name of each component of a device that is to be monitored by the teller terminal ("Part Name"), as well as fields to indicate the state of each component ("State") and the name of the device to which the component belongs ("Device Name").

The DB schema also defines a "Session" table 440 that enables banking customers to engage in banking sessions with the assisted self-service terminals. The "Session" table 440 includes fields to indicate the ID of each customer session ("Session ID"), the ID of the assisted self-service terminal on which each session is taking place ("Terminal ID"), and the ID of the customer who is involved in each session ("Customer ID"). The "Session" table 440 also includes fields to indicate the state of each customer session ("State") and the start and end times for each session ("Start Time," "End Time").

The "Session" table 440 links to a "Consumer" table 450 that includes fields identifying each of the banking facility's customers ("Customer ID"), a title for the customer ("Title"), and the customer's first and last names ("First Name," "Surname"). The "Consumer" table 450 in turn links to an "Account" table 460 that identifies all of the accounts associated with each customer. The "Account" table 460 includes fields that indicate an account number ("Account Number"), an account name ("Account Name") and an account balance ("Account Balance") for each of the customer's accounts, as well as the ID of the customer to whom each account belongs ("Consumer ID").

The DB schema 400 also defines a "Transaction" table 470 that monitors every transaction that a customer engages in during a given banking session. Transactions that might occur during a single banking session include, for example, deposits to one or more accounts, withdrawals from one or more accounts, and transfers of funds between accounts. The "Transaction" table includes fields that indicate, where appropriate, for each transaction the transaction number ("Trans Number"), the ID of the session in which the transaction is taking place ("Session ID"), the type of transaction ("Type"), the state of the transaction ("State"), the accounts involved in the transaction ("From Account," "To Account"), and the amount of money involved in the transaction ("Amount").

Linked to the "Transaction" table 470 are tables indicating the types of documents or instruments associated with each transaction. Examples are a "Check" table 480 and a "Deposit Slip" table 490. The "Check" table 480 includes fields indicating, for each check involved in a banking transaction, the MICR ("Magnetic Ink Character Recognition") code printed on the check ("MICR"), the amount of money drawn on the check ("Amount"), images of the front and back sides of the check ("Front Image," "Back Image"), and the transaction number for the transaction in which the check is processed ("Trans Number"). The "Deposit Slip" table 490 includes fields indicating the account number for the account to which each deposit is made ("Account Number"), the amount of money deposited to the account ("Amount"), and the transaction number for the transaction to which the deposit belongs ("Trans Number").

As stated above, any number of other tables could be defined by the DB schema 400, depending on the needs of the banking facility in which the teller-assist DB system resides. The terms "PK" and "FK" appearing in the database schema 400 of FIG. 4 refer to "primary keys" and "foreign keys" for the various database tables. Primary and foreign keys are concepts well understood in the art of database engineering and are not discussed in any detail here.

Communication between the teller-assist DB system 300 and applications using the system (such as the teller program $235_1$ and self-service program $235_2$ of FIG. 2) occurs through a commonly accepted connectivity standard. Perhaps the most common such standard is the Open Database Connectivity (ODBC) standard developed by the SQL Access Group. Using a standard such as the ODBC standard for communication with the database decouples database access from the structural and operational details of the underlying DB system, which in turn allows the banking facility to choose its database engine and its teller and assisted self-service terminals and application programs independently of each other.

Figure 5:
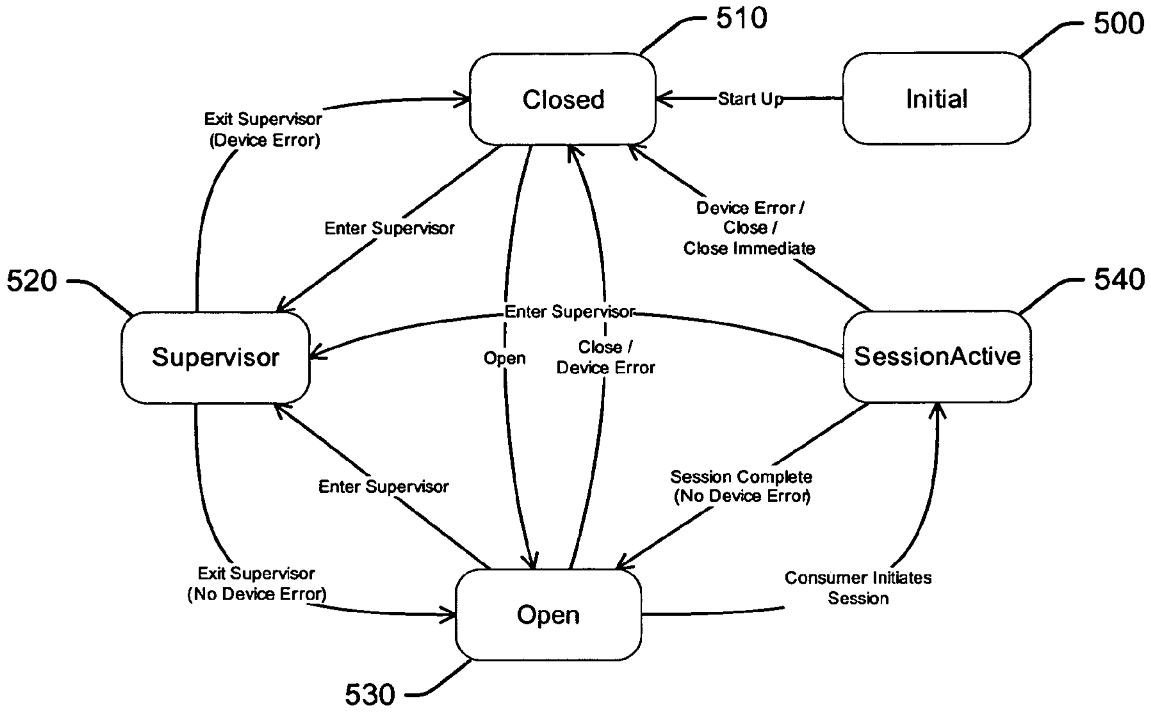
FIGS. 5, 6 and 7 show state transitions in an assisted self-service terminal.

FIG. 5 shows state transitions for each of the assisted self-service terminals. On start-up, each terminal sits in an "Initial" state 500 until start-up is complete and the terminal is ready for operation. The terminal then enters a "Closed" state 510, in which it awaits activation by a bank employee and is not available for customer sessions. A terminal in the "Closed" state 510 will typically display a message on its touch-screen monitor stating that the terminal is out of service.

From the "Closed" state, the banking facility can take the terminal to either a "Supervisor" state 520 or an "Open" state 530. In the "Supervisor" state 520, the terminal is available for use only by authorized bank employees; the terminal is not available for customer sessions. The "Supervisor" state 520 allows the banking facility to perform a wide variety of activities on the terminal, including diagnostics and repair, among others. From the "Supervisor" state 520, the terminal enters the "Closed" state 510 if the banking facility does not want to the terminal available for customer sessions or if an error occurs in the terminal, or it enters the "Open" state 530.

In the "Open" state 530, the assisted self-service terminal is available for customer sessions. The terminal in this state typically displays a message on its monitor indicating that it is open for service and ready to begin a customer session. When a customer engages a terminal in the "Open" state 530, the terminal enters either the "Closed" state 510 (e.g., when an error occurs in the terminal or when the terminal receives an instruction from the teller terminal to close immediately), or it enters a "Session Active" state 540.

In the "Session Active" state 540, the terminal interacts with the customer and communicates with the teller terminal and the teller-assist DB system through its self-service program. If necessary, the assisted self-service terminal in the "Session Active" state 540 sends messages to the teller terminal indicating that the customer needs teller assistance. The terminal remains in the "Session Active" state 540 until an error occurs or it receives an instruction from the teller terminal to close immediately, in which cases it returns to the "Closed" state 510, or until the customer session is completed, in which case it returns to the "Open" state 530.

As the assisted self-service terminal cycles through its various states of operation, the teller terminal receives messages that indicate what is happening at the assisted self-service terminal. These messages include:

"In Service"—The assisted self-service terminal has entered the "Open" state and is awaiting engagement by a customer.

"Out of Service"—The terminal has entered the "Closed" state and is not available for engagement by a customer.

"In Supervisor"—The terminal has entered the "Supervisor" state.

"Device Error"—An error has occurred in the assisted self-service terminal while in or entering the "Supervisor" state or the "Open" state. If the terminal enters the "Closed" state because of the device error, the teller terminal also receives an "Out of Service" message.

"Session Start"—A customer has initiated a session on the terminal and the terminal is entering the "Active" state.

"Session End"—The customer session has successfully completed and the terminal is returning to the "Open" state.

"Help Request"—The customer needs assistance from a bank teller.

In some cases, each assisted self-service terminal also reports the states of the devices it controls, such as its touch-screen monitor and card reader. Device state information is reported according to the common model of the Extensions for Financial Services (XFS) interface specification put forth by the American National Standards Institute, or some equivalent (e.g., J/XFS). Under this standard, each device (e.g., a receipt printer) in the assisted self-service terminal reports its state along with an optional list of critical device "parts" (e.g., paper and toner), if any, that the device maintains. Each device part has a name that is defined by or that can be derived from the XFS standard. The device names, part names, and statuses are stored in the teller-assist DB system as defined by the DB schema, discussed above.

As an example, a check-processing module in an assisted self-service terminal would report any one of several possible status indications at any given time. These status indications include: Online, Offline, Power Off, No Device, Hardware Error, User Error, and Busy. The check-processing module would also report on a part known as "Media," which indicates the status of the financial instrument (e.g., check) handler in the module. Possible status indications for the "Media" handler include: Present, Not Present, Jammed, Not Supported, Unknown, Entering, and Retracted.

The assisted self-service terminal reports state information by inserting the information into the appropriate tables in the teller-assist DB system. The terminal performs an update to the database when any of several events occur, including when:

The terminal receives an XFS device-status change event.

The terminal receives a device-replenishment change event.

The terminal exits the "Supervisor" state.

The terminal exits the "Closed" state.

Figure 6:
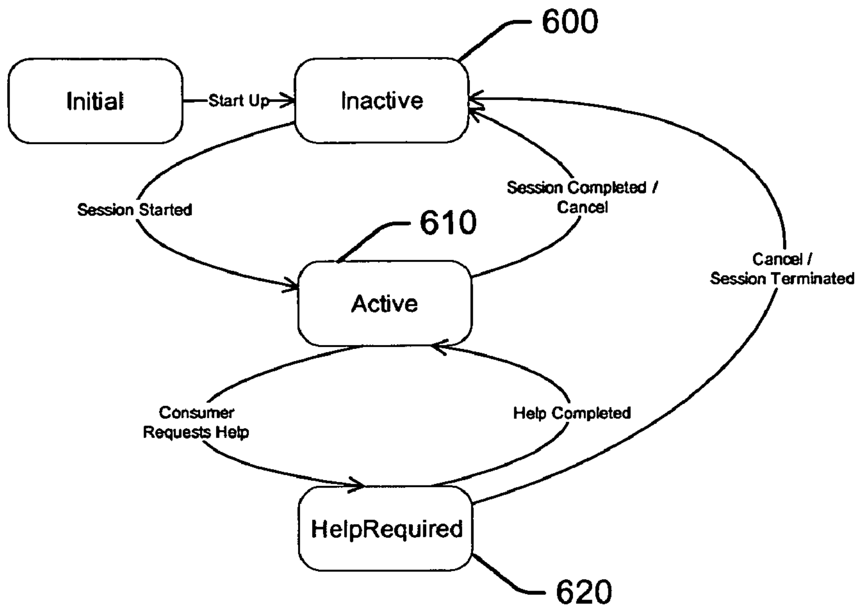

FIG. 6 shows additional state transitions for each assisted self-service terminal when the terminal is engaged in a customer session (i.e., when the terminal is in the "Session Active" state). As the terminal waits for a customer to engage it (e.g., by touching the touch-screen monitor), the terminal remains in an "Inactive" state 600. In the "Inactive" state 600, the terminal, through its display monitor, invites the customer to establish a session and waits for the customer to do so.

When the customer engages the terminal, the terminal enters an "Active" state 610. In the "Active" state 610, the assisted self-service terminal initiates a customer-authentication process which, when completed successfully, identifies the customer and gives the customer access to the customer's accounts. The authentication process in some banking facilities might require insertion of an ATM card and entry of a unique PIN code, as is standard practice in traditional ATMs. In other banking facilities, because the assisted self-service terminal is typically within view of a bank teller, the bank might choose to use an alternative customer-authentication process, such as through entry of a user-id/password combination, completion of a challenge/response exercise, or even visual identification of the customer by the teller. For some types of transactions, such as a deposit to a cash account, the bank might even choose not to require authentication of the customer at all.

Once in the "Active" state 610, the terminal remains in this state as it interacts with the customer until the customer session is completed or canceled, or until the customer or the terminal requests help from a bank teller. When help is requested from a teller, the assisted self-service terminal enters a "Help Required" state 620 and delivers a message to the teller terminal. The assisted self-service terminal remains in the "Help Required" state 620 until the teller either indicates that help is completed or terminates the session. If the teller indicates that help is completed, the terminal returns to the "Active" state 610 so that the customer can continue the session. If the teller terminates the session, the terminal returns to the "Inactive" state 600. Typically, the teller terminates the session at the assisted self-service terminal in one of three cases: (1) The teller was able to complete the customer session while helping the customer; (2) the teller has concluded that the session must be completed at the teller terminal; and (3) the teller is unable to complete the transaction at all. In the later case, the teller instructs the assisted self-service terminal to deliver all the information it has gathered to the teller terminal for continued processing there.

Figure 7:
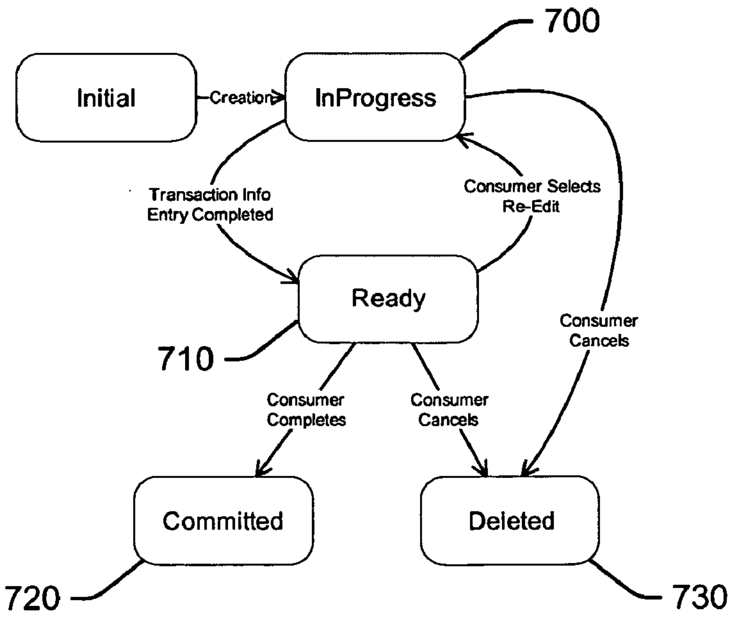

FIG. 7 shows additional state transitions for the assisted self-service terminal when the terminal engages in individual transactions within a customer session. As the customer initiates a transaction, the terminal enters an "In Progress" state 700, in which the terminal gathers information related to the transaction from the customer and from the teller-assist DB system, as well as from other sources such as the branch server, the bank host, and the ATM switch. The information to be gathered includes, for example, the type of transaction to take place, the accounts involved, and the amount of money involved. Once this information has been gathered, the terminal enters a "Ready" state 710, in which the terminal waits for the customer to commit the transaction or to cancel or edit it. If the customer chooses to edit the transaction, the terminal re-enters the "In Progress" state 700. If the customer chooses to commit the transaction, the terminal enters a "Committed" state 720 in which the transaction is completed. If the customer chooses to cancel the transaction, the terminal enters a "Deleted" state 730 in which the transaction is deleted and all of the information related to the transaction is discarded. The terminal also enters the "Deleted" state 730 if the customer chooses to cancel the transaction while the terminal is gathering information in the "In Progress" state 700.

Figure 8:
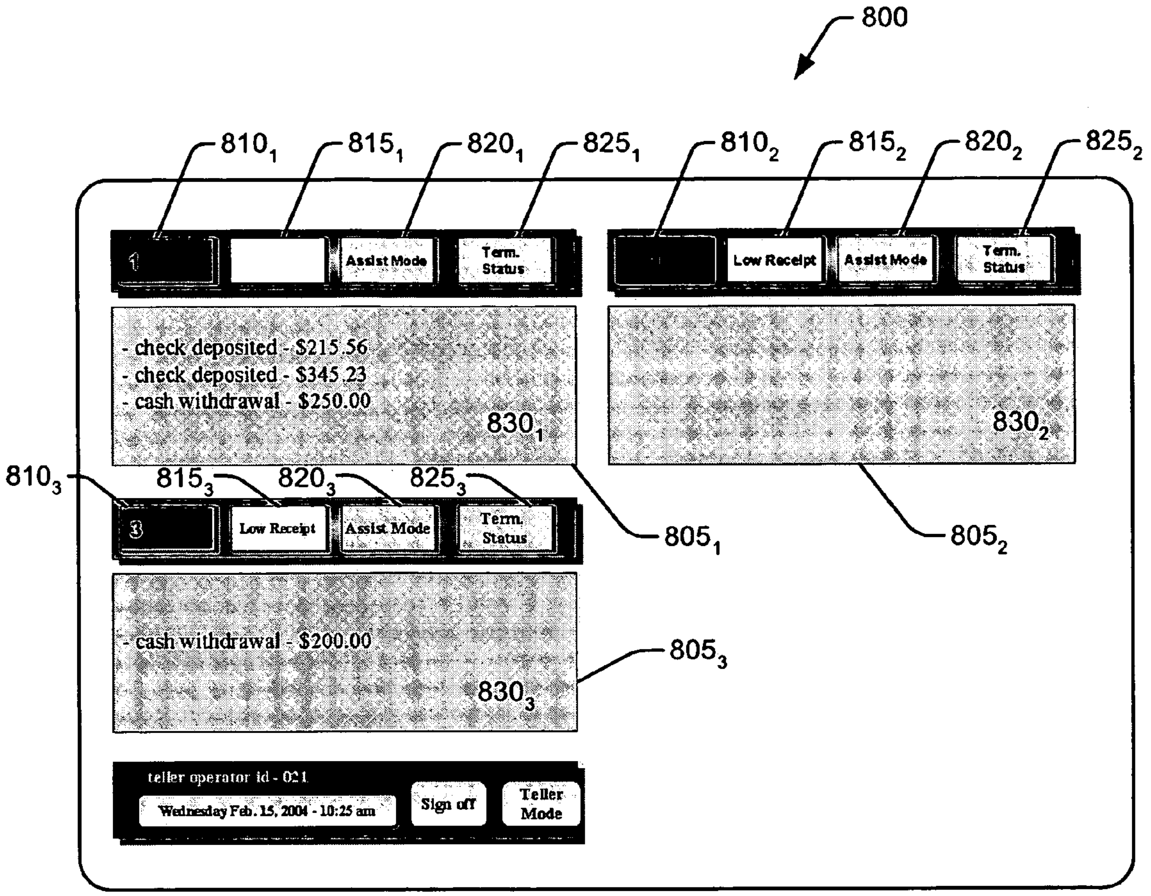
FIG. 8 shows a graphical user interface displayed on a teller terminal.

FIG. 8 shows one example of a graphical user interface, or "teller interface" 800, generated by the teller program (235$_1$ in FIG. 2) at the teller terminal (110 in FIG. 1) to give the bank teller an "at-a-glance" understanding of the status of each assisted self-service terminal (120$_{1 \ldots N}$ in FIG. 1) monitored by the teller terminal. The teller can see, for example, whether any of the assisted self-service terminals is engaged by a customer and, if so, what the status of that engagement is and whether the customer needs assistance. The teller interface 800 also provides details for the transactions taking place at each of the assisted self-service terminals.

As shown in this example, the teller interface 800 is a windows-style interface divided into one or more sections, or "terminal windows," each providing the teller with a view of what is transpiring at one of the assisted self-service terminals. In this example, the teller interface 800 is divided into three terminal windows 805$_{1 \ldots 3}$ corresponding to three assisted self-service terminals that are monitored by the teller terminal. For each assisted self-service terminal that it monitors, the teller terminal assigns the assisted self-service terminal an ID number (e.g., "Terminal 1," "Terminal 2," "Terminal 3"), which is displayed in a "terminal ID" box 810$_{1 \ldots 3}$ within the terminal window 805$_{1 \ldots 3}$. The terminal ID box also indicates the status of the corresponding assisted self-service terminal, typically using a color-coding scheme. For example, a terminal ID box shaded in green shows that the corresponding assisted self-service terminal is engaged by a customer and that the customer session is progressing normally, with no assistance needed from the teller. A terminal ID box shaded in red (or blinking red, as described below) shows that the assisted self-service terminal is engaged by a customer and that teller assistance might be needed. In some cases, when the terminal ID box suggests that assistance might be needed, the box also provides a text message indicating what type of assistance is needed and whether the teller should approach the customer immediately or wait some period of time before approaching. The following list shows one example of a color-coding scheme used by the teller terminal.

- No shading=Assisted self-service terminal (ASST) is operating properly and is waiting for customer engagement.
- Green=ASST is engaged in a customer session.
- Flashing green=ASST replenishables (e.g., receipt paper, coins, cash) are running low.
- Yellow=ASST is engaged in a customer session, but teller approval is needed for completion of one or more of the customer's transactions.
- Flashing red=ASST is engaged in a customer session, and the customer needs teller assistance.
- Red=The terminal is closed or has malfunctioned.

Other boxes 815$_{1 \ldots 3}$, 820$_{1 \ldots 3}$, 825$_{1 \ldots 3}$ within the terminal windows 805$_{1 \ldots 3}$ allow the teller terminal to display other messages created by the assisted self-service terminals and, in some cases, to initiate actions within the teller program itself. For example, the terminal windows 805$_2$, 805$_3$ associated with "Terminal 2" and "Terminal 3" in this example both include message boxes 8152, 8153 showing that paper in the receipt printer for the corresponding assisted self-service terminal is running low. An "Assist Mode" box 820$_{1 \ldots 3}$ in each teller window allows the teller to engage in an interactive session with the customer at the corresponding assisted self-service terminal without leaving the teller station. "Terminal Status" boxes 825$_{1 \ldots 3}$ allow the teller to gather detailed information about the status of each assisted self-service terminal, including the status of the devices and device parts maintained by the assisted self-service terminal.

The terminal windows 805$_{1 \ldots 3}$ also include "Transaction Details" boxes 830$_{1 \ldots 3}$ that each provides detailed information on the transactions taking place at the corresponding assisted self-service terminal. For example, the terminal window 805$_1$ associated with "Terminal 1" in this example shows that the customer is engaged in three separate transactions: (1) a check deposit of $215.56, (2) a check deposit of $345.43, (3) and a cash withdrawal of $250. As described above, the teller terminal and the assisted self-service terminals pass information and messages to each other using the relational tables or XML-based filed defined by the database schema of the teller-assist DB system (125 in FIG. 1).

The text above describes one or more specific embodiments of a broader invention. The invention also is carried out in a variety of alternative embodiments and thus is not limited to those described here. Many other embodiments are also within the scope of the following claims.

We claim:

1. A system for use in assisting a self-service transaction at a service facility, the system comprising:

- one or more self-service terminals, each configured to gather transaction information associated with a customer who is engaged in a business transaction with the service facility through the self-service terminal;
- a data-management system configured to store the transaction information gathered from each customer according to a database schema created for the service facility; and
- a teller terminal configured to receive at least some of the transaction information from the data-management system and display the transaction information for viewing by a human representative of the service facility while the customer is still engaged in the business transaction, transaction information presented for viewing by the human representative including information relating to customer activities occurring while the customer is still engaged in the business transaction.

2. The system of claim 1, where the transaction information retrieved by the teller terminal includes information indicating that the customer needs assistance from the human representative of the service facility at the self-service terminal.

3. The system of claim 1, where the transaction information retrieved by the teller terminal includes information indicating that the self-service terminal is in need of service.

4. The system of claim 1, where the data-management system comprises a relational database that includes one or more relational tables.

5. The system of claim 1, where the data-management system comprises a file-management system that manages one or more files of data.

6. The system of claim 5, where the file-management system manages one or more XML-based files.

7. The system of claim 1, where the data-management system is configured to store information identifying each of the self-service terminals to be monitored by the teller terminal.

8. The system of claim 7, where the data-management system is configured to store information indicating an operational status of each of the self-service terminals.

9. The system of claim 7, where the data-management system is configured to store information indicating one or more components that comprise one or more of the self-service terminals.

10. The system of claim 9, where the data-management system is configured to store information indicating an operational status of each of the components.

11. The system of claim 9, where the data-management system is configured to store information identifying a customer session for each customer who is engaged in a business transaction through one of the self-service terminals.

12. The system of claim 11, where the data-management system is configured to store information identifying the customer associated with each customer session.

13. The system of claim 11, where the data-management system is configured to store information identifying a type of transaction in which the customer is engaged during the customer session.

14. The system of claim 13, where the data-management system is configured to store information associated with more than one transaction in which the customer is engaged during the customer session.

15. The system of claim 13, where the data-management system is configured to store information identifying one or more customer accounts affected by the transaction in which the customer is engaged.

16. The system of claim 1, where the service facility is a banking facility and the self-service terminal is configured to assist the customer with a banking transaction.

17. A method for use in conducting a self-service transaction between a service facility and a customer of the service facility, the method comprising:

receiving transaction information associated with the customer from a self-service terminal through which the customer engages in the business transaction;

storing the transaction information in a storage facility according to a database schema created for the service facility; and while the customer is still engaged in the business transaction, delivering at least some of the transaction information from the storage facility for viewing by a human representative of the service facility, transaction information delivered for viewing by the human representative including information relating to customer activities occurring while the customer is still engaged in the business transaction.

18. The method of claim 17, where the transaction information delivered for viewing includes information indicating that the customer needs assistance from the human representative of the service facility at the self-service terminal.

19. The method of claim 17, where the transaction information delivered for viewing includes information indicating that the self-service terminal is in need of service.

20. A data-management system for use in conducting a self-service transaction between a service facility and a customer of the service facility, the data-management system comprising:

a data-storage facility configured to store, according to a database schema created for the service facility, transaction information associated with the customer who engages in the business transaction through a self-service terminal; and a data-management component configured to:

manage storage of the transaction information in the data-storage facility; and while the customer is still engaged in the business transaction, retrieve at least some of the transaction information from the data storage facility and deliver the transaction information for viewing by a human representative of the service facility, transaction information delivered for viewing by the human representative including information relating to customer activities occurring while the customer is still engaged in the business transaction.

21. The system of claim 20, where the transaction information retrieved by the data-management component includes information indicating that the customer needs assistance from the human representative of the service facility at the self-service terminal.

22. The system of claim 20, where the transaction information retrieved by the data-management component includes information indicating that the self-service terminal is in need of service.

23. A computer readable medium having a program stored thereon for executing a computer to conduct a self-service transaction in a service facility, the program comprising executable instructions that, when executed by a computer in a teller terminal used by a human representative of the service facility, cause the teller terminal to:

receive from a data-management system transaction information associated with a customer who is engaged in a business transaction with the service facility through a self-service terminal; and while the customer is still engaged in the business transaction, display at least some of the transaction information for viewing by the human representative of the service facility, transaction information displayed for viewing by the human representative including information relating to customer activities occurring while the customer is still engaged in the business transaction.

24. The computer readable medium of claim 23, where the program includes instructions that cause the teller terminal to display information indicating that the customer needs assistance from the human representative of the service facility at the self-service terminal.

25. The computer readable medium of claim 23, where the program includes instructions that cause the teller terminal to display information indicating that the self-service terminal is in need of service.

26. A computer readable medium having a program stored thereon for executing a computer to conduct a self-service transaction in a service facility, the program comprising executable instructions that, when executed by a computer in a teller terminal used by a human representative of the service facility, cause the teller terminal to:

receive from a data-management system transaction information associated with a customer who is engaged in a business transaction with the service facility through a self-service terminal; and while the customer is still engaged in the business transaction, display at least some of the transaction information for viewing by the human representative of the service facility, where the program includes instructions that cause the teller terminal to display information indicating that the self-service terminal is in need of service, and where the program includes instructions that cause the teller terminal to receive from the data-management system transaction information associated with at least two customers engaged in business transactions through at least two self-service terminals concurrently.

27. The computer readable medium of claim 26, where the program includes instructions that cause the teller terminal to display the transaction information in a manner that allows the human representative of the service facility to monitor the business transactions of both customers at once.

* * * * *